Jan. 8, 1963  C. W. HOWLETT  3,072,272
TRENCHING MACHINES
Filed May 19, 1959  3 Sheets-Sheet 1
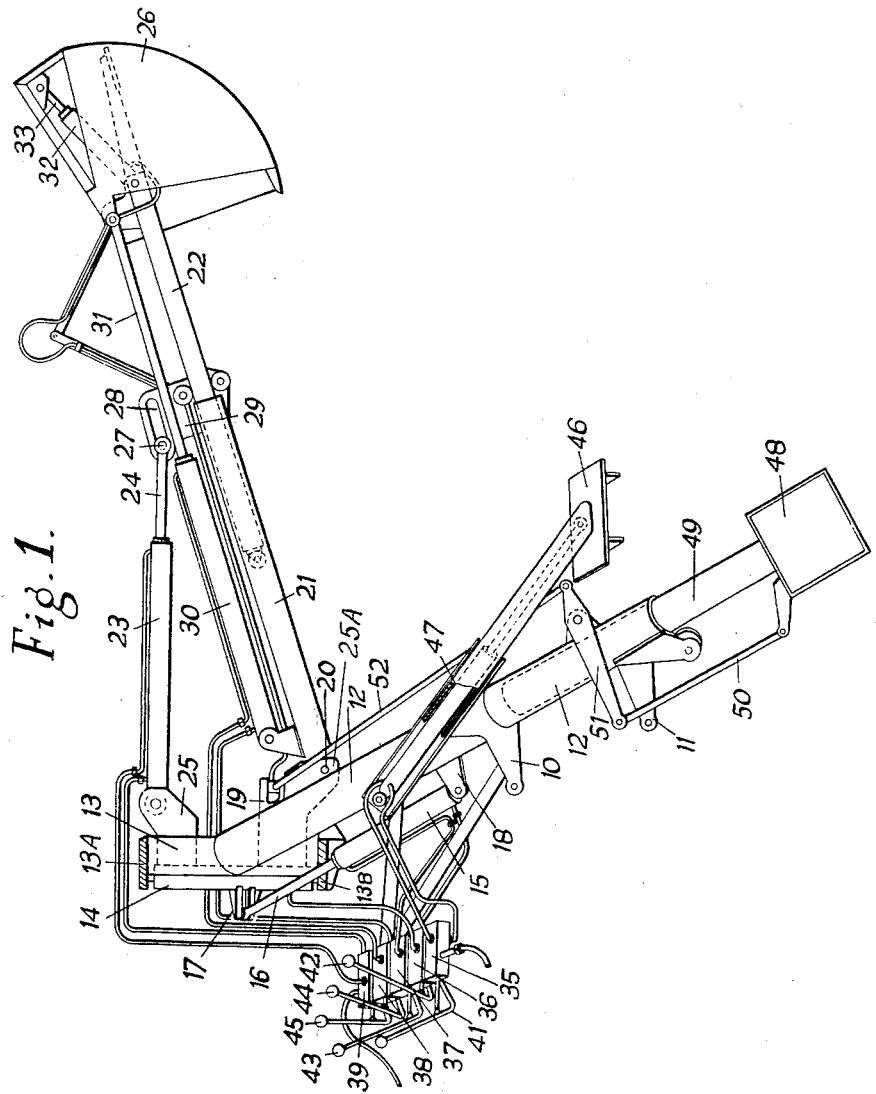
INVENTOR
CLAUDE W. HOWLETT
BY Jan. 8, 1963  C. W. HOWLETT  3,072,272
TRENCHING MACHINES
Filed May 19, 1959  3 Sheets-Sheet 2
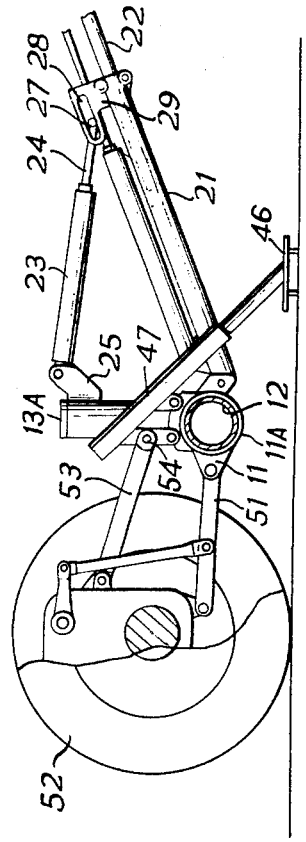
Fig. 3.
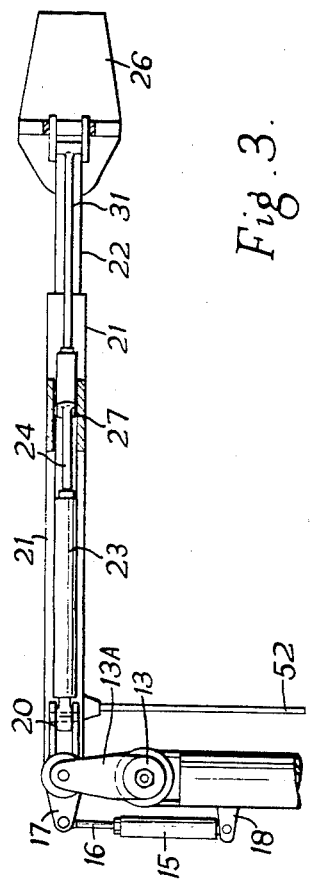
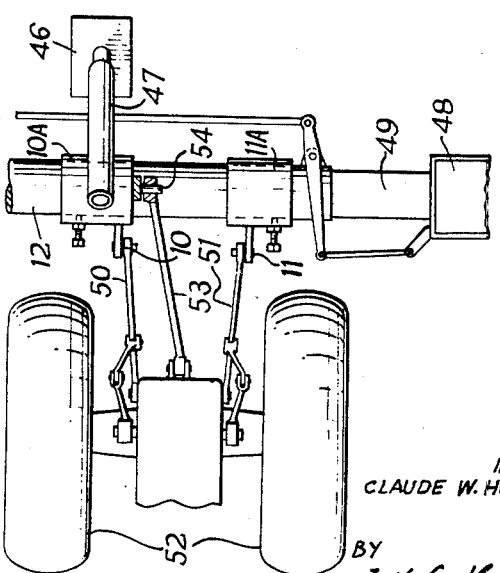
Fig. 2.
INVENTOR
CLAUDE W. HOWLETT
BY
AGENT Jan. 8, 1963 C. W. HOWLETT 3,072,272
TRENCHING MACHINES
Filed May 19, 1959 3 Sheets-Sheet 3
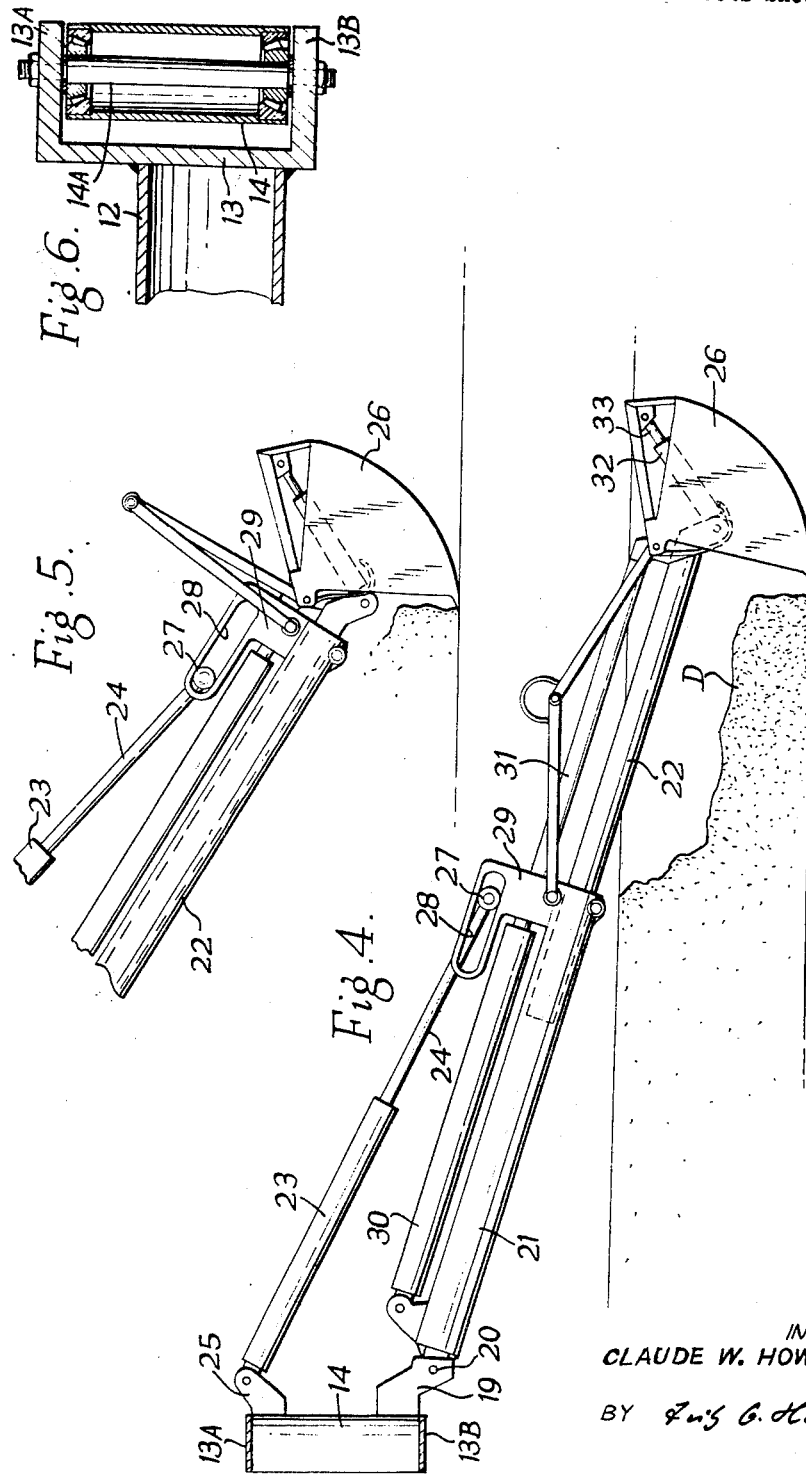
INVENTOR
CLAUDE W. HOWLETT
AGENT

United States Patent Office 3,072,272
Patented Jan. 8, 1963

3,072,272
TRENCHING MACHINES
Claude W. Howlett, London, England, assignor to Leeford (London) Limited, London, England
Filed May 19, 1959, Ser. No. 814,181
4 Claims. (Cl. 214—141)

This invention relates to trenching equipment for attachment to a tractor of the kind which are power operated by fluid pressure operated motors, either air or oil, and which comprise a boom to be attached to the rear end of a tractor so that the boom extends horizontally at the rear of the tractor with one end projecting beyond the tractor to one side thereof, and a jib at right angles to the boom and carrying earth excavating means at one end and attached to the projecting end of the boom by its other end through a vertical pivot to permit the free end of the jib with the earth excavating means to be slued in a horizontal plane to and from the discharge position.

Broadly, the present invention consists in trenching equipment of the kind specified which comprises a boom, means on the boom for attaching the same to a conventional part of a tractor so that the boom is horizontal and extends across the rear of the tractor, a further boom to extend longitudinally of the tractor and on one side thereof, said further boom being attached to one end of the first or transverse boom by means of a pair of pivots, one of said pivots being horizontal to permit the free end of said longitudinal boom to swing about said pivot in a vertical plane and the other pivot being vertical to permit said free end of the longitudinal boom to have a lateral or sluing movement in a horizontal plane, said longitudinal boom being adapted to carry an excavating bucket on its free end in such manner that said bucket is movable in a straight path which is in line with the longitudinal axis of the boom on the outer end of which it is mounted and power operated means for effecting the raising and sluing movements of the longitudinal boom and the relative longitudinal movements of the bucket.

In a preferred embodiment of the invention the boom is attached to the tractor in such manner that the boom may be swung bodily in a vertical plane whilst remaining in a horizontal position. Also the longitudinal or bucket carrying boom may be telescopic and movement lengthwise of this boom be imparted to have a lateral or sluing movement in a horizontal plane, said longitudinal boom being adapted to carry an excavating bucket on its free end in such manner that said bucket is movable in a straight path which is in line with the longitudinal axis of the boom on the outer end of which it is mounted and power operated means for effecting the raising and sluing movements of the longitudinal boom and the relative longitudinal movements of the bucket.

A constructional form of the invention is illustrated in the accompanying drawings wherein:

FIGURE 1 is a perspective view of a boom carrying trench digging means made in accordance with the invention;

FIGURE 2 is a plan view thereof showing the attachment of the boom to a tractor;

FIGURE 3 is a side elevation of the parts shown in FIGURE 1, illustrated at the commencement of digging;

FIGURE 4 is a side elevation showing the attachment to the tractor;

FIGURE 5 is a view of part of FIGURE 3 but showing the parts at the end of the digging stroke; and FIGURE 6 is a sectional view on the line 6—6 on FIGURE 2.

FIGURE 1 shows the parts in a more diagrammatic form than FIGURES 2 to 6 but the construction is essentially the same.

A tubular boom 12 carries forwardly extending arms 10, 11 by means of sleeves 10A, 11A which are adjustable along the boom. The arms 10, 11 are connected to the hydraulic lifting arms 50, 51 commonly provided on the tractor 52. The usual top link 53 of the tractor is fixed to any suitable part on the boom such as pin 54.

In a preferred embodiment of the invention the boom 12 is thus attached to the tractor in such manner that the boom may be swung bodily in a vertical plane whilst remaining in a horizontal position. At one end the transverse arm 12 has a vertical piece 13 with flanges 13A, 13B at its upper and lower ends to which a tube 14 is pivotally attached so as to be swingable about the vertical axis of a pin 14A under the control of a sluing ram which has a cylinder 15 and a piston rod 16 and which acts between a projection 17 on the tube 14 and a projection 18 on the transverse boom 12. Pivotally attached to a bracket 19 on the bar 14 by a horizontal pivot axis 20 is one end part 21 of a further telescopic boom having two parts 21 and 22, the part 22 forming a bucket carrier means. This further boom is at right angles to the first boom and in use extends longitudinally along one side of the tractor. Pivotal movement of this further telescopic boom about the horizontal pivot axis is effected by a lifting ram which has a cylinder 23 and piston rod 24 and which acts between the part 21 of the boom and a bracket 25 on the upper end of the tube 14. The outer part 22 of the said further telescopic boom carries a bucket 26 at its end remote from the tube 14. The connection between the piston rod 24 of the lifting ram and the part 21 of the boom includes a pin and slot lost motion connection, the piston rod 24 being joined to a pin 27 slidable in a slot 28 in an upward extension 29 at the end of part 21 of the boom, so that the lifting ram does not prevent downward swinging of the boom during the digging movement and so allows the bucket to move horizontally. A further ram referred to as the digging ram has a cylinder 30 and piston rod 31 and controls telescopic movement of the two parts 21 and 22 of the boom. The bucket 26 is pivotally mounted at the end of part 22 of the boom for tilting under the control of an emptying ram which has a cylinder 32 connected to the part 22 of the boom and a piston rod 33 coupled to the bucket.

To effect a digging operation the further or longitudinal boom or jib 21, 22 is extended by the operation of the digging ram 30, 31 and is then lowered by operation of the lifting ram 23, 24 to bring the bucket 26 into contact with the soil. Soil is picked up by the bucket during shortening of the boom by the digging ram. The boom is raised by the lifting arm 23, 24 to a position in which it can be slued by the sluing arm 15, 16 and after or during sluing the bucket 26 is tilted by the emptying ram 32, 33 to empty it. Finally the boom and bucket are returned to the lowered position for another digging operation. It will be noted that the sequence of operations is performed by coordinating the ram operations, the sluing arm being operated only after the lifting ram has raised the boom to an appropriate position. To ensure correct operating sequence the rams are controlled by valves 35, 36, 37, 38 and 39 operated by levers 41, 42, 43, 44 and 45 respectively which may, if desired, be interlocked mechanically. Alternatively, the valves may be operated automatically or semi-automatically by a sequence controlling mechanism. The levers are mounted so as to be accessible to the tractor driver. The fluid under pressure supplied from a pump on the tractor is fed through hoses and pipelines to the rams which are shown as being double acting excepting in the case of the emptying ram. The hydraulic or pneumatic system is advantageously provided with safety valves (not shown) to prevent the building up of excessive pressures in the event of movement under the action of one of the rams being prevented.

To prevent movement of the tractor during digging, the trenching machine is provided with a spade or sprag 46 which is caused to engage the ground during operation of the machine and is carried by an inclined hydraulic ram 47 mounted on the member 10.

A counterweight 48 carried by a tube 49 slidable in the transverse arm 12 is coupled to the bracket 19 by a linkage 50, 51, 52 so as to slide outwardly when the boom swings outwardly in the opposite senses.

I claim:

1. A trenching equipment which comprises a first boom, means on the first boom for attaching the same to a conventional part of a tractor so that the first boom is horizontal and extends across the tractor, a second boom extending longitudinally of the tractor, means including a horizontal pivot for mounting the second boom on the first boom, a bucket, bucket carrier means for mounting the bucket on the second boom, means for moving said carrier means and said bucket axially of the second boom, extensible means for moving the second boom about said pivot, means for attaching one end of said extensible means pivotally to said first boom, and lost motion means for connecting the other end of said extensible means to the second boom whereby the second boom can swing about said pivot during digging to permit the bucket to travel in a straight horizontal line.

2. A trenching equipment which comprises a first boom, means on the first boom for attaching the same to a conventional part of a tractor so that the first boom is horizontal and extends across the tractor, an upright member mounted on the first boom for rotation about a substantially vertical axis, slewing means for rotating said upright member, a second boom extending longitudinally of the tractor at one end of the first boom, a horizontal pivot attaching one end of the second boom to said upright member, a bucket, bucket carrier means for mounting the bucket on the second boom, means for moving the carrier means and bucket axially of the second boom, extensible means for moving the second boom about said pivot, means for attaching one end of said extensible means pivotally to said upright member and lost motion means for connecting the other end of said extensible means to the second boom whereby the second boom can swing about said pivot during digging to permit the bucket to travel in a straight horizontal line, whereafter the bucket can be lifted by raising the second boom about said pivot and slewed laterally about the vertical axis of said upright member by operation of said slewing means.

3. A trenching equipment according to claim 1 wherein the first boom has means for pivotal connection to the tractor lifting arms whereby the first boom can be swung up and down whilst its axis remains in a horizontal position.

4. A trenching equipment as in claim 1 wherein the first boom is composed of telescoping portions arranged so that at least one end can be adjustably extended relatively to the portion carrying the means for attaching the equipment to the tractor.

References Cited in the file of this patent

UNITED STATES PATENTS

| | | |
|---|---|---|
| 1,345,008 | Hill | June 29, 1920 |
| 2,421,379 | Harding | June 3, 1947 |
| 2,501,112 | Webster | Mar. 21, 1950 |
| 2,672,990 | Sundin | Mar. 23, 1954 |
| 2,785,813 | Tofflemire | Mar. 19, 1957 |
| 2,791,340 | Haines | May 7, 1957 |
| 2,834,489 | Davis | May 13, 1958 |
| 2,847,134 | Slate | Aug. 12, 1958 |

FOREIGN PATENTS

| | | |
|---|---|---|
| 1,014,229 | France | May 28, 1952 |